March 20, 1962     R. SÖMMER     3,025,711
TRANSMISSION SYSTEM
Filed April 11, 1958     2 Sheets-Sheet 1

INVENTOR:
REINHOLD SÖMMER
BY
AGENT

March 20, 1962 R. SÖMMER 3,025,711
TRANSMISSION SYSTEM
Filed April 11, 1958 2 Sheets-Sheet 2

INVENTOR:
REINHOLD SÖMMER
BY
AGENT

3,025,711
TRANSMISSION SYSTEM
Reinhold Sömmer, Nordhausen, Harz, Germany, assignor to VEB Schlepperwerk Nordhausen, Nordhausen, Harz, Germany, a corporation of Germany
Filed Apr. 11, 1958, Ser. No. 727,942
Claims priority, application Germany July 1, 1957
8 Claims. (Cl. 74—342)

The present invention relates to a transmission system for automotive vehicles.

It is known that certain vehicles, for instance dumpers, bulldozers, rail-borne self-propelled cars, and farming tractors, have to be provided with speed-changing means operating equally well in forward and in reverse direction. These vehicles generally have sliding-gear drives having special reversing gears associated therewith so as to satisfy the above-mentioned requirement. The reversing gears are usually built either as spur gears or as bevel differential gears and are in most of the cases also fitted with a claw coupling.

Conventional transmission systems of the above character have certain disadvantages, among them relatively intricate construction involving high manufacturing costs. In some cases they are encumbered with a high-speed gear (direct drive or overdrive) for both directions although its presence is actually required only for forward motion.

It is an object of the present invention to overcome these drawbacks and to provide a transmission system for automotive vehicles which is of limited dimensions and simple construction.

A feature of this invention is the provision of a transmission system comprising a plurality of shafts, including an output shaft, an intermediate shaft and at least one auxiliary shaft to which the input is applied and on which a supplemental gear, preferably in the form of a double spur wheel, is mounted. A speed-reversing mechanism, which includes the supplemental gear, couples the input shaft with the intermediate shaft in such manner that the latter will be driven either in forward or in reverse direction, its torque being then transmitted to the output shaft through a conventional gear shift or other speed-changing device.

Given an arrangement of this type the number of gears required for speed-changing and reversing purposes is not higher, with several forward and reverse speeds, than the number required in a conventional system having the same number of forward speeds but only one reverse speed.

Another feature of the present invention is the provision of means for obtaining a high-speed forward drive by clutching the input shaft to the output shaft directly, i.e. in a manner bypassing the intermediate shaft and its speed-changing device, in combination with means for preventing such connection in the reverse-drive position of the system. This insures virtually foolproof operation of the system and avoids objectionable jolts and shocks in the case of hasty or inadvertent manipulation.

The above and other features will become more fully apparent from the following detailed description, given with reference to the accompanying drawing in which.

Figure 1:
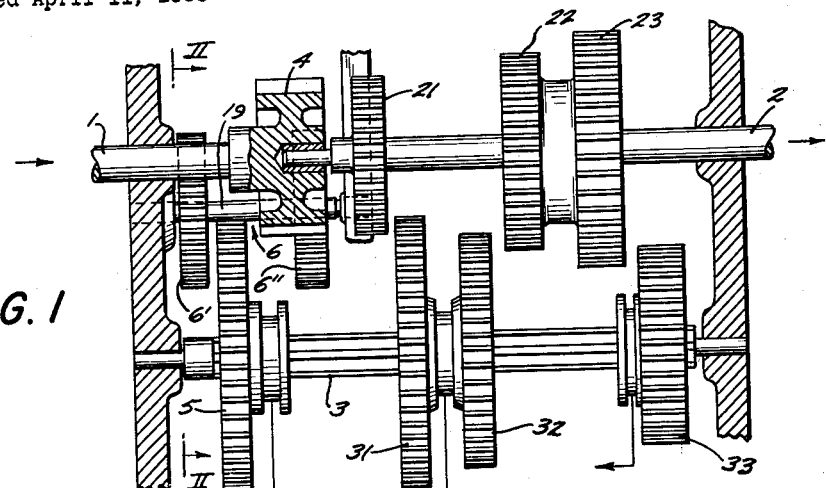
FIG. 1 illustrates an embodiment of my transmission system, having three forward and also three reverse speeds, in axial section.
Figure 2:
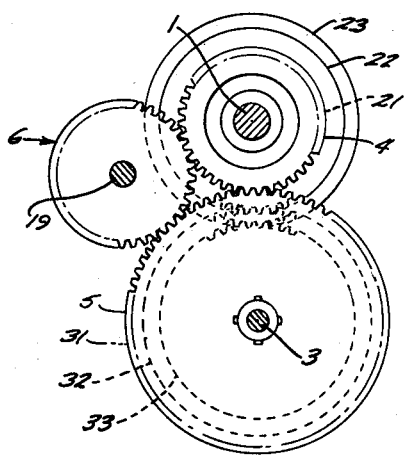
FIG. 2 is a face view of the system of FIG. 1, taken on the line II—II thereof.

In FIGS. 1 and 2, an input shaft 1 is aligned with an output shaft 2. An intermediate shaft 3 is provided with a splined profile and slidably supports a reversing gear 5. This gear can be axially shifted by means of a reversing-control lever (not shown), as indicated by the arrow, either to the right or to the left. In its right-hand position it engages a co-operating reversing gear 4 which is a simple spur wheel rigid with input shaft 1; in its left-hand position it meshes with a spur wheel 6' which, together with a second spur wheel 6", constitutes a supplemental gear 6 mounted on auxiliary shaft 19. Spur wheel 6" constantly engages the gear 4. Thus, the sense of rotation of the intermediate shaft 3 will depend on the position of the shiftable reversing gear 5. Output shaft 2 is driven by gear 5 via a conventional speed changer comprising the usual sets of slidable gears 31, 32, 33 on splined shaft 3 and fixed gears 21, 22, 23 on output shaft 2. The positioning of gears 31, 32, 33 can be controlled by the usual shift lever (not shown) as indicated by the arrows. The number of gear pairs can be optionally increased to provide a desired number of speeds; the number of forward speeds will be identical with the number of reverse speeds in this embodiment.

Figure 3:
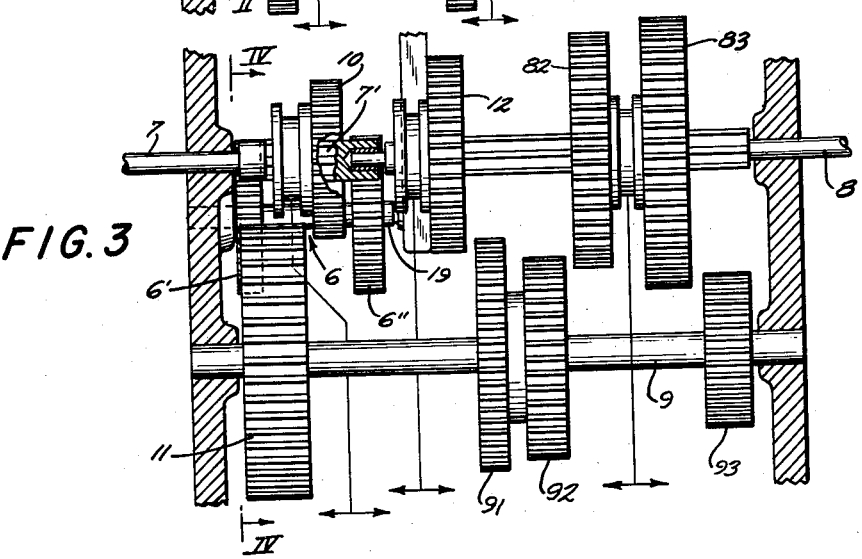
FIG. 3 shows another embodiment of a transmission system, provided with four forward and three reverse speeds, in axial section.
Figure 4:
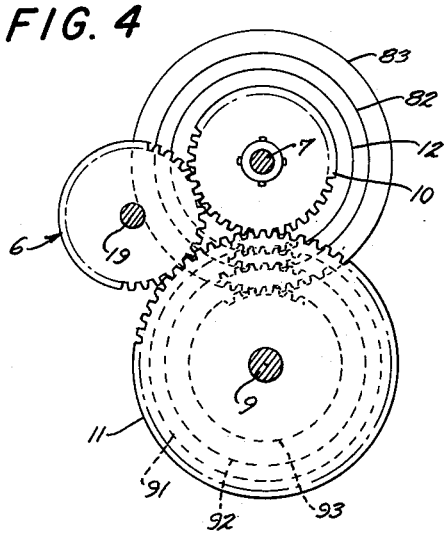
FIG. 4 is a face view of the system of FIG. 3, taken on the line IV—IV thereof.

In FIGS. 3 and 4, output shaft 8 has been splined to carry axially slidable gears 12, 82, 83 designed for selective engagement of the fixed gears 91, 92, 93 on intermediate shaft 9. Another fixed gear 11 on shaft 9 is in constant mesh with spur wheel 6' and is also engageable by a co-operating reversing gear 10 which is slidable on a splined input shaft 7 aligned with output shaft 8. Gear 10, when moved to the right, disengages the gear 11 and meshes with spur wheel 6", the supplemental gear 6 being again mounted on an auxiliary shaft 19. The operation of the co-operating gears 10, 11 is analogous to that of their counterparts 4, 5 in the preceding embodiment.

The transmission shown in FIGS. 3 and 4 has an additional high speed obtained by shifting the internally fluted direct-speed gear 12 on output shaft 8 to the left so that this gear bridges the profiles of both shafts 7 and 8. The end of shaft 7 facing output shaft 8 has a tapered terminal portion 7' which facilitates the sliding engagement of this shaft by gear 12. This operation is possible only if switching gear 10 has been shifted by the reversing-control lever to its left-hand position corresponding to forward drive, so that direct-speed gear 12 may slide unobstructed onto a portion of shaft 7. It will be understood that the gearshift lever must be so connected to gear 12 as to be able to move it into its bridging position only with gears 82, 83 disengaged from gears 92, 93.

Figure 6:
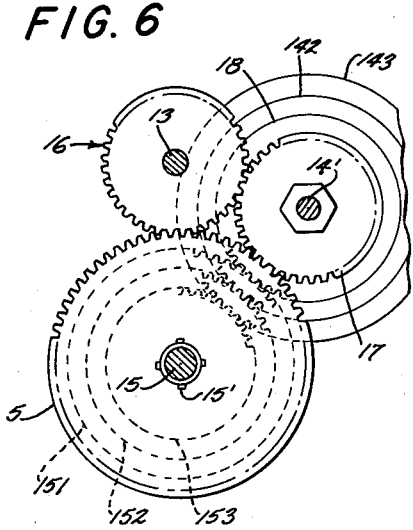
FIG. 6 is a face view of the system of FIG. 5, taken on the line VI—VI thereof.
Figure 5:
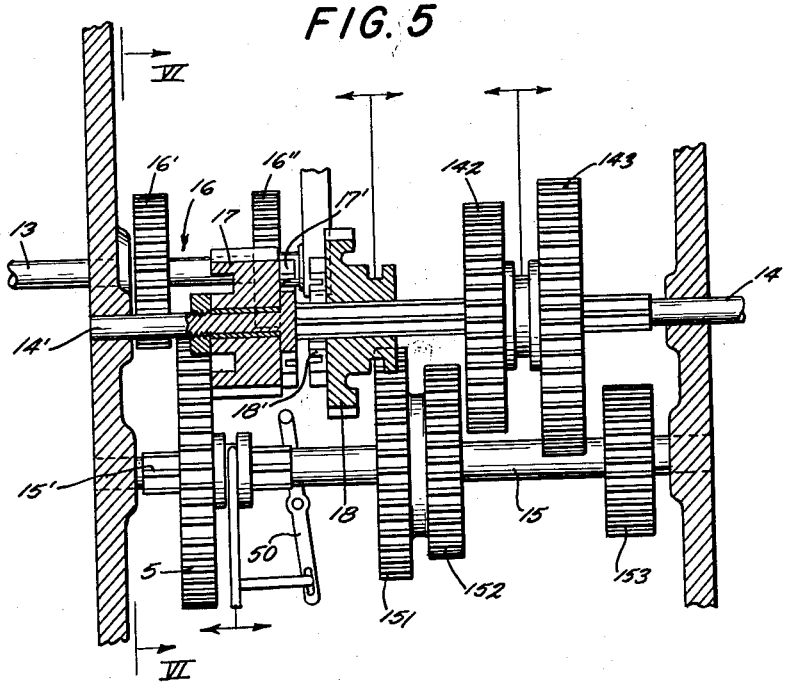
FIG. 5 shows a transmission system similar to that illustrated in FIG. 4, also for four forward and three reverse speeds, in axial section.

In FIGS. 5 and 6 another embodiment is shown in which input shaft 13 carries, as a driving pinion, the supplemental gear 16 consisting of spur wheels 16' and 16". The latter meshes with a gear 17 loosely mounted on an auxiliary shaft taking the form of an extension 14' of output shaft 14. This output shaft is splined and carries a set of slidable gears 18, 142, 143 while the intermediate shaft 15 carries the fixed gears 151, 152, 153 co-operating therewith. A splined portion 15' of shaft 15 carries the switching gear 5 which is alternately engageable with spur wheel 16' and with co-operating reversing gear 17.

The switching principle of this embodiment is identical with that of FIGS. 3 and 4, with the difference, however, that the pairs of gears 16" and 17 are an effective part of the system for both the forward and the reverse speeds. Thus, on direct drive the sense of rotation of output shaft 14 will be opposite to that of input shaft 13. This direct drive is accomplished by the interengagement of dogs 17′, 18′ on gears 17 and 18, respectively, to perform a clutching action.

For this operation the reversing-control lever has again to be shifted to the forward position which here coincides with the right-hand position of switching gear 5. As a safety measure, a blocking device in the form of a linkage 50 is so positionable by the gear 5 that operation of clutch 17′, 18′ is positively prevented if gear 5 is in its left-hand position, i.e. in engagement with spur wheel 16′. Again, gears 142, 143 must be out of mesh with gears 152, 153 when the gear 18 is moved leftward for direct entrainment by gear 17.

It will be understood that the invention may be realized in various forms deviating in detals of construction from the embodiments specifically described and illustrated without departing from the spirit and scope of the appended claims.

I claim:

1. A transmission system comprising an input shaft, an auxiliary shaft and a further shaft; a first co-operating gear on said further shaft; a second co-operating gear on one of the remaining shafts; supplemental gear means on the other of said remaining shafts; shift means for displacing one of said co-operating gears into selective engagement wtih alternately said supplemental gear means and the other co-operating gear, said co-operating gear being axially fixed and in continuous mesh with said supplemental gear means, whereby said further shaft is reversibly rotatable upon a continuous rotation of said input shaft; and speed-changing means coupling said further shaft to a load, said speed-changing means including an output shaft and direct-drive means positionable to establish a direct connection between said other co-operating gear and said output shaft, the system further comprising blocking means operative to prevent said connection in a position of said one co-operating gear corresponding to reverse rotation of said output shaft relative to said other co-operating gear.

2. A transmission system comprising an input shaft, an auxiliary shaft and a further shaft; a first co-operating gear on said further shaft; a second co-operating gear on one of the remaining shafts; supplemental gear means on the other of said remaining shafts; shift means for displacing one of said co-operating gears into selective engagement with alternately said supplemental gear means and the other co-operating gear, said other co-operating gear being axially fixed and in continuous mesh with said supplemental gear means, whereby said further shaft is reversibly rotatable upon a continuous rotation of said input shaft; an output shaft aligned with said one of said remaining shafts; and speed-changing gear means coupling said further shaft to said output shaft.

3. A transmission system according to claim 2 wherein said input shaft is splined, said one co-operating gear being axially slidable on said input shaft.

4. A transmission system according to claim 3 wherein said output shaft is splined and aligned with said input shaft, said speed-changing means including a direct-drive gear slidable into bridging engagement with the profiles of both said input shaft and said output shaft.

5. A transmission system according to claim 4 wherein said speed-changing gear means is adapted to rotate said further and output shafts in mutually opposite directions and wherein said one co-operating gear is positioned to prevent said bridging engagement upon its own engagement with said supplemental gear means.

6. A transmission system according to claim 1 wherein said output shaft forms a splined extension of said auxiliary shaft, said other co-operating gear being freely rotatable on said auxiliary shaft.

7. A transmission system according to claim 6 wherein said direct-drive means comprises a direct-drive gear axially slidable on said splined extension and having clutch means operable to engage said other cooperating gear.

8. A transmission system according to claim 7 wherein said speed-changing means includes gear means adapted to rotate said further and output shafts in mutually opposite directions, further comprsng blockng means controlled by said one co-operating gear for preventing said clutching engagement in its position of engagement with said supplemental gear means.

References Cited in the file of this patent

UNITED STATES PATENTS

| | | |
|---|---|---|
| 737,442 | Mooers | Aug. 25, 1903 |
| 869,494 | King | Oct. 29, 1907 |
| 928,727 | Wolf | July 20, 1909 |
| 1,174,778 | Trego | Mar. 7, 1916 |
| 2,323,384 | Eberhard | July 6, 1943 |
| 2,332,970 | Huber | Oct. 26, 1943 |
| 2,535,632 | Herr | Dec. 26, 1950 |